(12) United States Patent
Aoki et al.

(10) Patent No.: US 12,092,380 B2
(45) Date of Patent: Sep. 17, 2024

(54) POWER ELEMENT AND EXPANSION VALVE USING SAME

(71) Applicant: FUJIKOKI CORPORATION, Tokyo (JP)

(72) Inventors: Yutaro Aoki, Tokyo (JP); Junya Hayakawa, Tokyo (JP); Yusuke Takahashi, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 234 days.

(21) Appl. No.: 17/778,967

(22) PCT Filed: Nov. 25, 2020

(86) PCT No.: PCT/JP2020/043824
§ 371 (c)(1),
(2) Date: May 23, 2022

(87) PCT Pub. No.: WO2021/106934
PCT Pub. Date: Jun. 3, 2021

(65) Prior Publication Data
US 2022/0412617 A1 Dec. 29, 2022

(30) Foreign Application Priority Data
Nov. 25, 2019 (JP) .................. 2019-212470

(51) Int. Cl.
*F25B 41/33* (2021.01)
*F16K 31/00* (2006.01)
*F25B 41/335* (2021.01)

(52) U.S. Cl.
CPC .......... *F25B 41/335* (2021.01); *F16K 31/002* (2013.01)

(58) Field of Classification Search
CPC ....... F25B 41/335; F16K 7/17; F16K 31/1262
See application file for complete search history.

(56) References Cited

U.S. PATENT DOCUMENTS

2019/0344765 A1   11/2019   Bialon et al.

FOREIGN PATENT DOCUMENTS

| CN | 107762831 A | 3/2018 |
| DE | 102016009402 A1 | 2/2018 |

(Continued)

OTHER PUBLICATIONS

Extended European Search Report dated Oct. 20, 2023 for the corresponding European Application No. 20893904.1.

(Continued)

*Primary Examiner* — Eric S Ruppert
(74) *Attorney, Agent, or Firm* — Lucas & Mercanti, LLP

(57) ABSTRACT

Provided are a power element and an expansion valve using same that are capable of obtaining a desired temperature/flow rate characteristic while being low cost. A power element includes a diaphragm; an upper lid member that is joined to one side of an outer circumferential portion of the diaphragm and forms a pressure working chamber PO with the diaphragm; an annular support point adjustment member that is joined to another side of an outer circumferential portion of the diaphragm; a receiving member that is joined to the support point adjustment member and forms a refrigerant inflow chamber LS with the diaphragm, and a stopper member housed in the refrigerant inflow chamber LS, wherein the diaphragm is capable of coming into contact with a support point of the support point adjustment member.

6 Claims, 9 Drawing Sheets

(56) References Cited

FOREIGN PATENT DOCUMENTS

| EP | 3770536 A1 | | 1/2021 |
|----|------------|---|--------|
| JP | H07-133972 A | | 5/1995 |
| JP | H09-79703 A | | 3/1997 |
| JP | 2010281337 A | * | 12/2010 |
| JP | 2019163896 A | | 9/2019 |

OTHER PUBLICATIONS

Office Action dated Apr. 11, 2023 for the corresponding Japanese Application No. 2019-212470, with English.
International Search Report dated Jan. 12, 2021 for the corresponding application No. PCT/JP2020/043824, with English translation.
Office Action dated Aug. 30, 2023 for the corresponding Chinese Application No. 202080076730.3, with English translation.
Decision of Refusal dated Sep. 5, 2023 for the corresponding Japanese Application No. 2019-212470, with English translation.
Pct, Written Opinon of ISA dated Jan. 12, 2021 for the corresponding application No. PCT/JP2020/043824, with English translation.

* cited by examiner

POWER ELEMENT AND EXPANSION VALVE USING SAME

CROSS REFERENCE TO RELATED APPLICATION

This Application is a 371 of PCT/JP2020/043824 filed on Nov. 25, 2020 which, in turn, claimed the priority of Japanese Patent Application No. 2019-212470 filed on Nov. 25, 2019, both applications are incorporated herein by reference.

TECHNICAL FIELD

The present invention relates to a power element and an expansion valve using same.

BACKGROUND OF THE INVENTION

Conventionally, in the refrigeration cycles used in air conditioners or the like mounted in automobiles, temperature-sensitive temperature expansion valves are used that adjust the amount of refrigerant passing through according to the temperature. In such temperature expansion valves, power elements are employed to drive the valve element with the pressure of an enclosed working gas.

The power element provided in the expansion valve illustrated in Patent Document 1 is provided with a diaphragm, an upper lid member that forms a pressure working chamber in which a working gas is sealed between the diaphragm, a receiving member provided with a through hole in its central portion and arranged on the opposite side of the upper lid member with respect to the diaphragm, and a stopper member disposed in a fluid inflow chamber formed between the diaphragm and the receiving member and connected to an operation rod for driving a valve element. The diaphragm is made of a thin and flexible metal plate.

If the temperature of the refrigerant flowing into the fluid inflow chamber is low, heat is taken from the working gas in the pressure working chamber to cause contraction, and if the temperature of the refrigerant is high, heat is applied to the working gas in the pressure working chamber to cause expansion. Since the diaphragm deforms according to the contraction/expansion of the working gas, the valve element can be opened and closed via the stopper member and the operating rod in accordance with the amount of deformation, whereby adjustment of the flow rate of the refrigerant passing through the expansion valve can be performed.

CITATION LIST

Patent Documents

[Patent Document 1] Japanese Unexamined Patent Application Publication No. 2019-163896

SUMMARY OF INVENTION

Technical Problem

Incidentally, depending on the specifications of the refrigerant circulation system using the expansion valve, there are cases in which it may be desirable to fine-tune the flow rate characteristics of the refrigerant with respect to temperature (referred to as the temperature/flow rate characteristics). According to the prior art, the shape of the power element is changed for each specification to obtain desired temperature/flow rate characteristics. However, even a slight change in characteristics requires a change in molds and the like of parts of the power element, which leads to an increase in the cost of the expansion valve.

Accordingly, an object of the present invention is to provide a power element and an expansion valve using same that are capable of obtaining a desired temperature/flow rate characteristic while being low cost.

Means for Solving the Problems

In order to achieve the above object, a power element according to the present invention includes a diaphragm; an upper lid member that is joined to one side of an outer circumferential portion of the diaphragm and that forms a pressure working chamber with the diaphragm; an annular support point adjustment member that is joined to another side of an outer peripheral portion of the diaphragm; and a receiving member that is joined to the support point adjustment member and that forms a refrigerant inflow chamber with the diaphragm, wherein the diaphragm is capable of coming into contact with a support point of the support point adjustment member.

Advantageous Effects of Invention

According to the present invention, it is possible to provide a power element and an expansion valve using same that are capable of obtaining a desired temperature/flow rate characteristic while being low cost.

DESCRIPTION OF EMBODIMENT(S)

Hereinafter, the embodiments according to the present invention will be described with reference to the figures.

Definition of Directions

In the present specification, the direction extending from the valve element 3 toward the operation rod 5 is defined as the "upward direction," and the direction extending from the operation rod 5 toward the valve element 3 is defined as the "downward direction." Accordingly, in the present specification, the direction extending from the valve element 3 toward the operation rod 5 is referred to as the "upward direction" regardless of the orientation of the expansion valve 1.

First Embodiment

Figure 1:
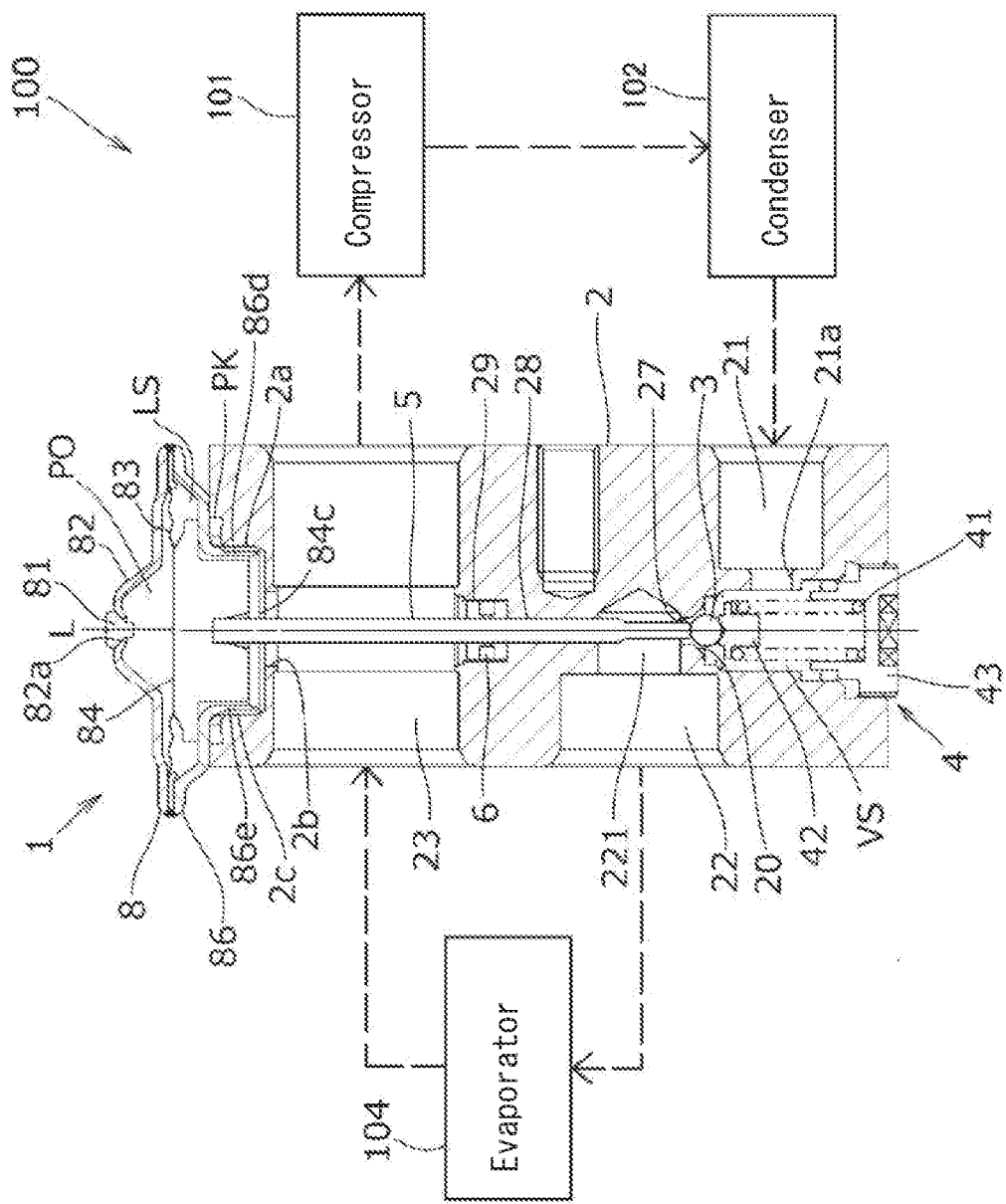
FIG. 1 is a schematic cross-sectional view schematically illustrating an example in which the expansion valve according to the present embodiments is applied to a refrigerant circulation system.

An overview of an expansion valve 1 including a power element according to the first embodiment will be described with reference to FIG. 1. FIG. 1 is a schematic cross-sectional view schematically illustrating an example in which the expansion valve 1 according to the present embodiments is applied to a refrigerant circulation system 100. In the present embodiment, the expansion valve 1 is fluidly connected to a compressor 101, a condenser 102, and an evaporator 104. L is set as the axis of the expansion valve 1.

In FIG. 1, the expansion valve 1 includes a valve main body 2 having a valve chamber VS, a valve element 3, a biasing device 4, an operation rod 5, and a power element 8.

The valve main body 2 includes a first flow path 21, a second flow path 22, an intermediate chamber 221, and a return flow path (also referred to as a refrigerant passage) 23 in addition to the valve chamber VS. The first flow path 21 is a supply-side flow path, and a refrigerant is supplied to the valve chamber VS via the supply-side flow path. The second flow path 22 is a discharge-side flow path, and the fluid in the valve chamber VS is discharged to the outside of the expansion valve through a valve through-hole 27, the intermediate chamber 221 and the discharge-side flow path.

The first flow path 21 and the valve chamber VS are connected with each other by a connecting path 21*a* having a smaller diameter than the first flow path 21. The valve chamber VS and the intermediate chamber 221 are connected with each other via the valve seat 20 and the valve through-hole 27.

The operation rod insertion hole 28 formed above the intermediate chamber 221 has a function for guiding the operation rod 5, and the annular recess 29 formed above the operation rod insertion hole 28 has a function of accommodating a ring spring 6. The ring spring 6 has a plurality of spring pieces applying a predetermined biasing force by coming into contact with the outer circumference of the operation rod 5.

The valve element 3 is arranged in the valve chamber VS. When the valve element 3 is seated on the valve seat 20 of the valve main body 2, the flow of the refrigerant through the valve through-hole 27 is restricted. This state is referred to as a non-communicating state. However, even in the case that the valve element 3 is seated on the valve seat 20, a limited amount of refrigerant may flow. On the other hand, when the valve element 3 is separated from the valve seat 20, the flow of the refrigerant passing through the valve through-hole 27 increases. This state is referred to as a communication state.

The operation rod 5 is inserted into the valve through-hole 27 with a predetermined gap. The lower end of the operation rod 5 is in contact with the upper surface of the valve element 3. The upper end of the operation rod 5 is fitted into a fitting hole 84*c* of the stopper member 84, which will be described later.

The operation rod 5 can press the valve element 3 in a valve opening direction against the biasing force of the biasing device 4. When the operation rod 5 moves downward, the valve element 3 is separated from the valve seat 20 and the expansion valve 1 is opened.

In FIG. 1, the biasing device 4 includes a coil spring 41 formed by helically winding a wire member having a circular cross section, a valve element support 42, and a spring receiving member 43.

The valve element support 42 is attached to the upper end of the coil spring 41, a spherical valve element 3 is welded to the upper surface thereof, and both are integrated together.

The spring receiving member 43 that supports the lower end of the coil spring 41 can be screwed against the valve main body 2, and has a function of sealing the valve chamber VS and a function of adjusting the biasing force of the coil spring 41.

Power Element

Figure 2:
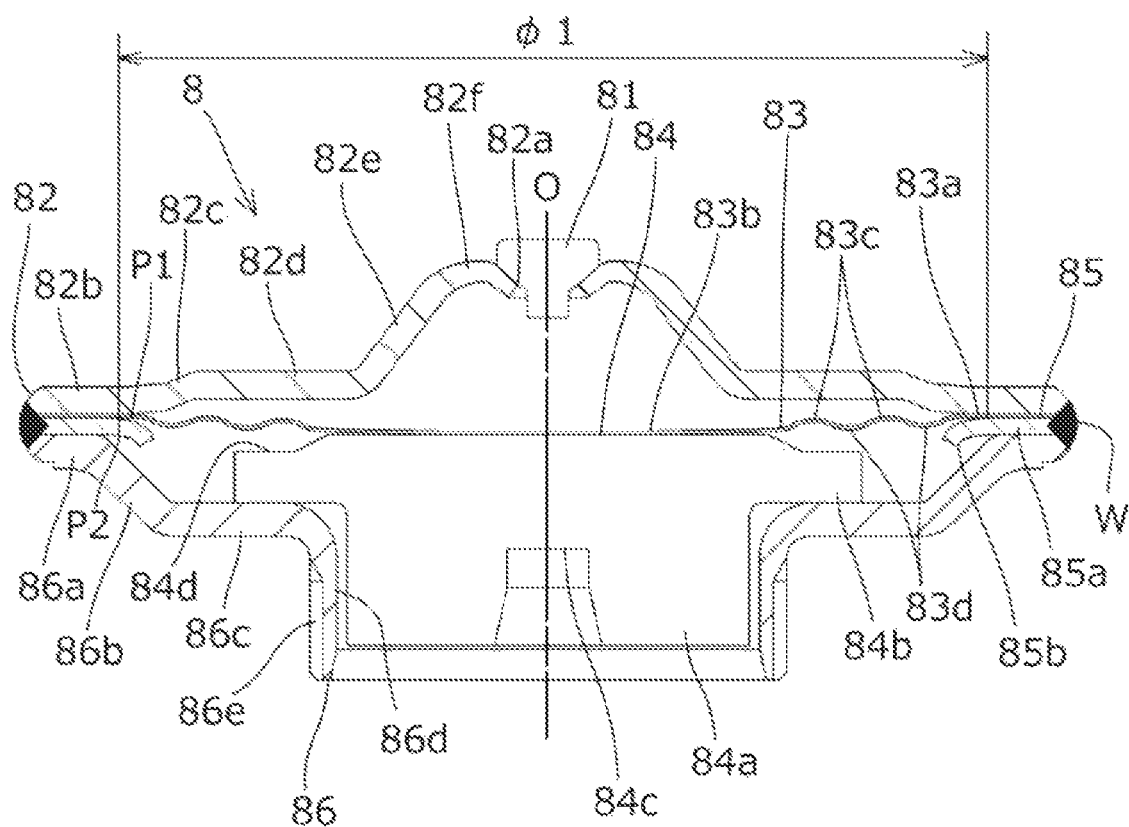
FIG. 2 is an enlarged cross-sectional view of the power element of the first embodiment.
Figure 3:
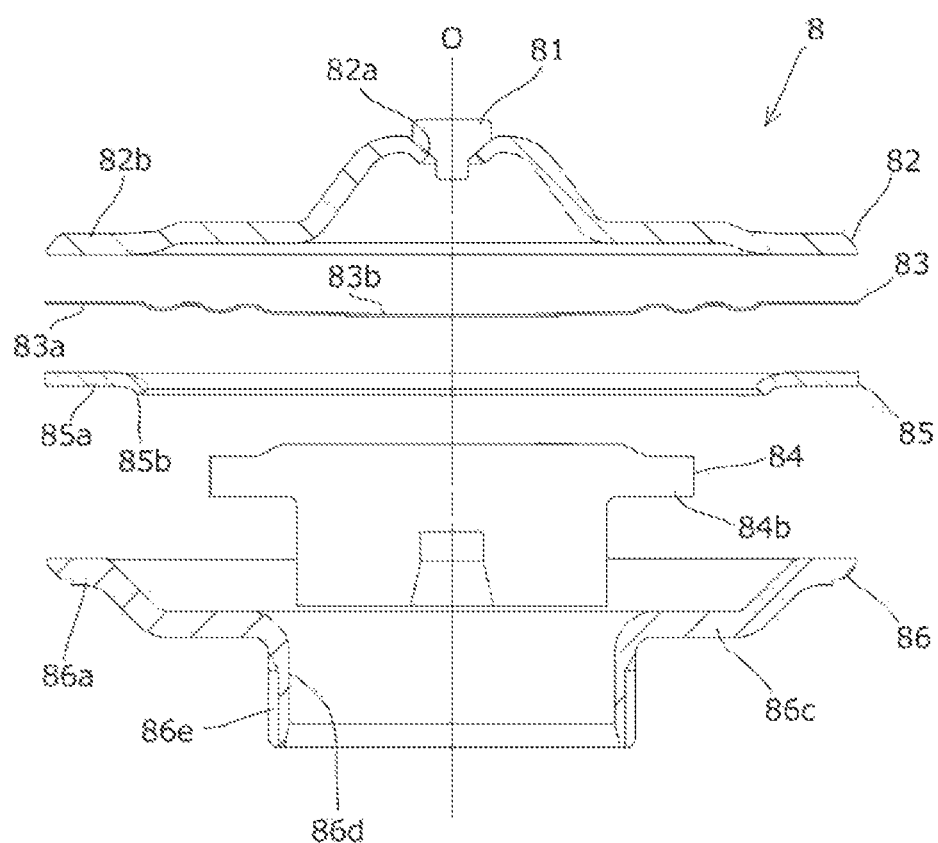
FIG. 3 is an exploded view of the power element of the first embodiment.

Next, the power element 8 will be described. FIG. 2 is an enlarged cross-sectional view of the power element 8. FIG. 3 is an exploded view of the power element 8 of the first embodiment. The power element 8 includes a plug 81, an upper lid member 82, a diaphragm 83, a support point adjustment member 85, a receiving member 86, and a stopper member 84. Again, it is assumed that the upper lid member 82 side is the upper side and the receiving member 86 side is the lower side.

The upper lid member 82 is formed, for example, by molding a metal plate material by pressing. The upper lid member 82 includes an annular outer plate portion 82*b*, an outer tapered portion 82*c* that extends toward the upper side and is continuously provided on the inner circumference of the outer plate portion 82*b*, an annular intermediate plate portion 82*d* which is continuously provided on the inner circumference of the outer tapered portion 82*c*, an inner tapered portion 82*e* that extends toward the upper side and is continuously provided on the inner circumference of the intermediate plate portion 82*d*, and a top portion 82*f* which is continuously provided on the inner circumference of the inner tapered portion 82*e*. An opening portion 82*a* is formed in the center of the top portion 82*f* and can be sealed by the plug 81.

The receiving member 86 that opposes the upper lid member 82 is formed, for example, by molding a metal plate material by pressing. The receiving member 86 includes a flange portion 86*a* having an outer diameter substantially the same as the outer diameter of the outer plate portion 82*b* of the upper lid member 82, a conical portion 86*b* that extends toward the lower side and is continuously provided on the inner circumference of the flange portion 86*a*, an annular inner plate portion 86*c* continuously provided on the inner circumference of the conical portion 86*b*, and a hollow cylindrical portion 86*d* continuously provided on the inner circumference of the inner plate portion 86*c*. A male screw 86*e* is formed on the outer circumference of the hollow cylindrical portion 86*d*.

On the other hand, as illustrated in FIG. 1, a female screw 2*c* that engages with the male screw 86*e* is formed on the inner circumference of a recess portion 2*a* of the valve main body 2 to which the hollow cylindrical portion 86*d* is attached.

In FIG. 2, the diaphragm 83 arranged between the upper lid member 82 and the support point adjustment member 85 is made of a thin and flexible metal (for example, SUS) plate material, and has an outer diameter that is substantially the same as the outer diameters of the upper lid member 82 and the receiving member 86.

More specifically, the diaphragm 83 has an outer circumferential portion 83a interposed between the upper lid member 82 and the support point adjustment member 85, and a central portion 83b that comes into contact with the stopper member 84. In addition, the diaphragm 83 is coaxial with the axis O between the outer circumferential portion 83a and the central portion 83b, and is provided with a plurality of upper ring-shaped portions 83c protruding upward and a plurality of lower ring-shaped portions 83d protruding downward alternately along the radial direction. In the present embodiment, in the cross section illustrated in FIG. 2, the upper ring-shaped portion 83c and the lower ring-shaped portion 83d have a periodic shape such that a substantially sinusoidal curve is formed, but the circumferential groove-shaped upper ring-shaped portion and the lower ring-shaped portion having semicircular cross sections may be independently formed on the flat plate.

The support point adjustment member 85 is formed in a substantially annular shape having an outer diameter substantially equal to that of the diaphragm 83 by molding a metal plate material such as SUS by pressing. More specifically, the support point adjustment member 85 includes an annular flat plate portion 85a that has a wider radial width than the flange portion 86a of the receiving member 86, and a supporting curved surface portion 85b that is connected to the inner circumference of the annular flat plate portion 85a and extends downward. It is preferable that the annular flat plate portion 85a and the supporting curved surface portion 85b are connected via a smooth curved surface. The annular flat plate portion 85a is interposed and held between the outer circumferential portion 83a of the diaphragm 83 and the flange portion 86a of the receiving member 86. It should be noted that it is desirable for the hardness of the support point adjustment member 85 to be lower than the hardness of the receiving member 86, and it is further desirable for the hardness of the support point adjustment member 85 to be lower than the hardness of the diaphragm 83. As a result, in the case that foreign matter enters the vicinity of the support point of the support point adjustment member 85, the foreign matter is buried in the surface of the support point adjustment member 85, such that damage to the diaphragm 83 can be mitigated.

The stopper member 84 includes a cylindrical main body 84a, a disk portion 84b continuously provided on the upper end of the main body 84a and extending in the radial direction, and a blind hole-shaped fitting hole 84c formed in the center of the lower surface of the main body 84a. The central top surface of the disk portion 84b is in contact with the lower surface of the central portion 83b of the diaphragm 83. The outer circumferential portions of the disk portion 84b other than the central top surface are lower than the central top surface so as to form an outer circumferential step portion 84d.

Next, the assembly procedure of the power element 8 will be described with reference to FIG. 2 and FIG. 3. After arranging the support point adjustment member 85 and the stopper member 84 between the diaphragm 83 and the receiving member 86, the outer plate portion 82b of the upper lid member 82, the outer circumferential portion 83a of the diaphragm 83, the annular flat plate portion 85a of the support point adjustment member 85, and the flange portion 86a of the receiving member 86 are overlapped in this order and pressed in the axial direction. Meanwhile, the outer circumference is welded by, for example, TIG welding, laser welding, plasma welding, or the like to form a welded portion W (see FIG. 2) over the entire circumference, such that the components are integrated.

Subsequently, the working gas is sealed in the space (referred to as the pressure working chamber PO, see FIG. 1) surrounded by the upper lid member 82 and the diaphragm 83 from the opening 82a formed in the upper lid member 82, and then the opening 82a is sealed with the plug 81. Further, the plug 81 is fixed to the upper lid member 82 by projection welding or the like.

At this time, since the diaphragm 83 receives pressure in a form of projecting toward the receiving member 86 due to the working gas sealed in the pressure working chamber PO, the central portion 83b of the diaphragm 83 comes into contact with the central top surface of the stopper member 84 arranged in the lower space (refrigerant inflow chamber) LS (see FIG. 1) surrounded by the diaphragm 83 and the receiving member 86. As a result, the disk portion 84b of the stopper member 84 is held between the diaphragm 83 and the inner plate portion 86c of the receiving member 86.

When the power element 8 assembled as described above is attached to the valve main body 2, the axis O is aligned with the axis L, and the male screw 86e on the outer circumference of the lower end of the hollow cylindrical portion 86d of the receiving member 86 engages with the female screw 2c formed on the inner circumference of the recess portion 2a of the valve main body 2. When the male screw 86e of the hollow cylindrical portion 86d is screwed with respect to the female screw 2c, the inner plate portion 86c of the receiving member 86 comes into contact with the upper end surface of the valve main body 2. As a result, the power element 8 can be fixed to the valve main body 2.

At this time, a packing PK is interposed between the power element 8 and the valve main body 2, and the space in the recess portion 2a connected to the lower space LS is sealed to prevent the refrigerant from leaking from the recess portion 2a. In this state, the lower space LS of the power element 8 communicates with the return flow path 23 via the communication hole 2b.

Operation of the Expansion Valve

An example of the operation of the expansion valve 1 will be described with reference to FIG. 1. The refrigerant pressurized by the compressor 101 is liquefied by the condenser 102 and sent to the expansion valve 1. Further, the refrigerant adiabatically expanded by the expansion valve 1 is sent to the evaporator 104, and the evaporator 104 exchanges heat with the air flowing around the evaporator. The refrigerant returning from the evaporator 104 is returned to the compressor 101 side through the expansion valve 1 (more specifically, the return flow path 23). At this time, by passing through the evaporator 104, the fluid pressure in the second flow path 22 becomes larger than the fluid pressure in the return flow path 23.

A high-pressure refrigerant is supplied to the expansion valve 1 from the condenser 102. More specifically, the high-pressure refrigerant from the condenser 102 is supplied to the valve chamber VS via the first flow path 21.

When the valve element 3 is seated on the valve seat 20 (when in the non-communicating state), the flow rate of the refrigerant sent from the valve chamber VS to the evaporator 104 through the valve through-hole 27, the intermediate chamber 221 and the second flow path 22 is limited. On the other hand, when the valve element 3 is separated from the valve seat 20 (when in the communicating state), the flow rate of the refrigerant sent from the valve chamber VS to the evaporator 104 through the valve through-hole 27, the intermediate chamber 221 and the second flow path 22 increases. Switching between the closed state and the open state of the expansion valve 1 is performed by the operation rod 5 connected to the power element 8 via the stopper member 84.

In FIG. 1, a pressure working chamber PO and a lower space LS partitioned by a diaphragm 83 are provided inside the power element 8. Accordingly, when the working gas in the pressure working chamber PO is liquefied, the diaphragm 83 rises, such that the stopper member 84 and the operation rod 5 move upward according to the biasing force of the coil spring 41. On the other hand, when the liquefied working gas is vaporized, the diaphragm 83 and the stopper member 84 are pressed downward, such that the operation rod 5 moves downward. In this way, the expansion valve 1 is switched between an open state and a closed state.

Further, the lower space LS of the power element 8 communicates with the return flow path 23. Accordingly, the volume of the working gas in the pressure working chamber PO changes according to the temperature and pressure of the refrigerant flowing through the return flow path 23, and the operation rod 5 is driven. In other words, in the expansion valve 1 illustrated in FIG. 1, the amount of the refrigerant supplied from the expansion valve 1 toward the evaporator 104 is automatically adjusted according to the temperature and pressure of the refrigerant returning from the evaporator 104 to the expansion valve 1.

Support Point Adjustment Member

The operation of the support point adjustment member 85 will be described. The diaphragm 83 is displaced toward the upper lid member 82 side or the receiving member 86 side across the neutral position in accordance with the volume change of the working gas in the pressure working chamber PO. The "neutral position" refers to a position in which the diaphragm is not subject to a reaction force from a support point on the upper lid member side or from a support point on the support point adjustment member side.

It should be noted that when the diaphragm bends and becomes displaced, the "support point on the upper lid member side" refers to the point on the upper lid member that is in contact with a boundary point between a portion (that does not displace toward the upper lid member side) where the diaphragm is restricted by coming into contact with the upper lid member and a portion displaced toward the upper lid member side. In the example of FIG. 2, the support point on the upper lid member 82 side is P1.

In addition, when the diaphragm bends and becomes displaced, the "support point on the support point adjustment member side" refers to the point on the support point adjustment member that is in contact with a boundary point between a portion (that does not displace toward the receiving member side) where the diaphragm is restricted by coming into contact with the support point adjustment member and a portion displaced toward the receiving member side. In the example of FIG. 2, the support point on the support point adjustment member 85 side is P2 on the supporting curved surface portion 85b. When the support point P2 is connected along the entire circumference, it becomes a circle centered on the axis O, and its diameter (referred to as the support point diameter) is $\varphi 1$.

Here, the supporting curved surface portion 85b of the support point adjustment member 85 projects inward from the flange portion 86a of the receiving member 86. Supposing that the support point adjustment member 85 were not provided, the diaphragm 83 would come into direct contact with the receiving member 86, such that a support point (a support point on the receiving member side) would be generated on the receiving member 86 instead of the support point on the support point adjustment member side; however, the diameter of the support point on the receiving member side at this time would clearly be larger than the support point diameter 91 on the support point adjustment member side. That is, by providing the support point adjustment member 85, there is an effect of reducing the support point diameter.

FIRST MODIFIED EXAMPLE

Figure 4:
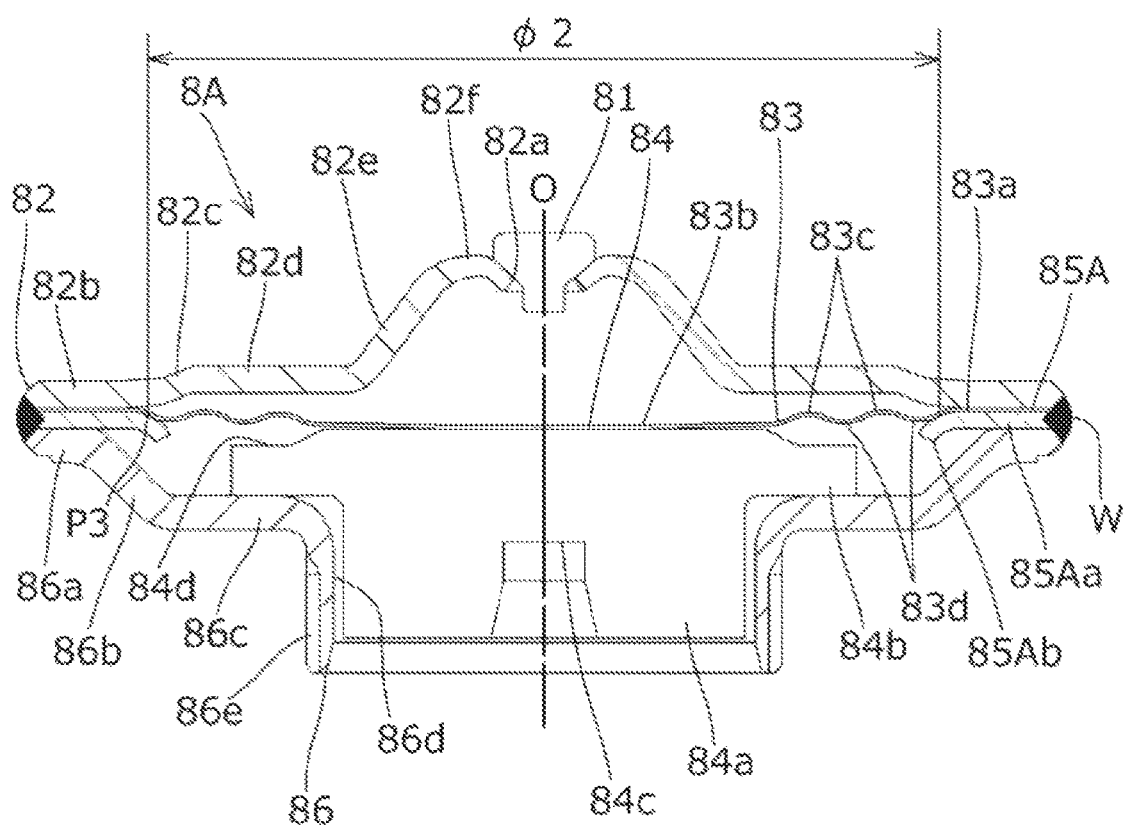
FIG. 4 is an enlarged cross-sectional view of the power element of the first modified example.

FIG. 4 is an enlarged cross-sectional view of the power element 8A of the first modified example. In this modified example, the shape of the support point adjustment member 85A is modified with respect to the power element 8 of the first embodiment. More specifically, the radial width of the annular flat plate portion 85Aa is widened toward the inner circumferential side with respect to the first embodiment. As a result, the support point on the support point adjustment member 85A side becomes P3 on the supporting curved surface portion 85Bb, and the support point diameter thereof becomes $\varphi 2$. At this time, $\varphi 1 > \varphi 2$. Since the rest of the configuration is the same as that in the above-described embodiment, the same reference numerals are given and a redundant description is omitted.

SECOND MODIFIED EXAMPLE

Figure 5:
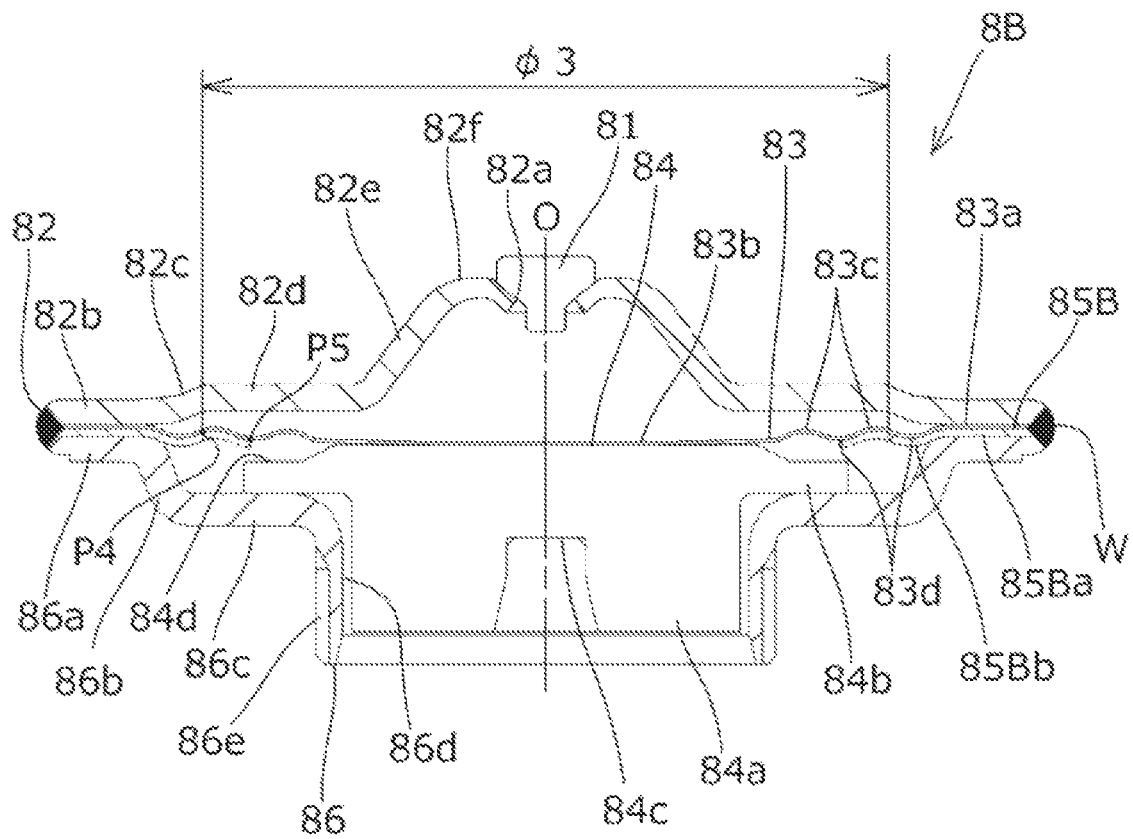
FIG. 5 is an enlarged cross-sectional view of the power element of the second modified example.

FIG. 5 is an enlarged cross-sectional view of the power element 8B of the second modified example. In this modified example, the shape of the support point adjustment member 85B is further changed with respect to the power element 8A of the first modified example. More specifically, although the annular flat plate portion 85Ba is the same with respect to the first modification, the supporting curved surface portion 85Bb is extended to the axis O-side while conforming to the shape of the diaphragm 83. In this way, the support point P4 of the support point adjustment member 85B becomes an end portion of the supporting curved surface portion 85Bb, and the support point diameter becomes $\varphi 3$. At this time, $\varphi 2 > \varphi 3$.

In the present modified example, a receiving member having a modified shape is used for the receiving member 86 of the above embodiments, but since both members have basically the same configuration, they are denoted by the same reference numerals and descriptions thereof are omitted. In addition, as the rest of the configuration is the same as that of the above-described embodiments, the same reference numerals are assigned, and a repetitive description thereof is omitted.

Figure 6:
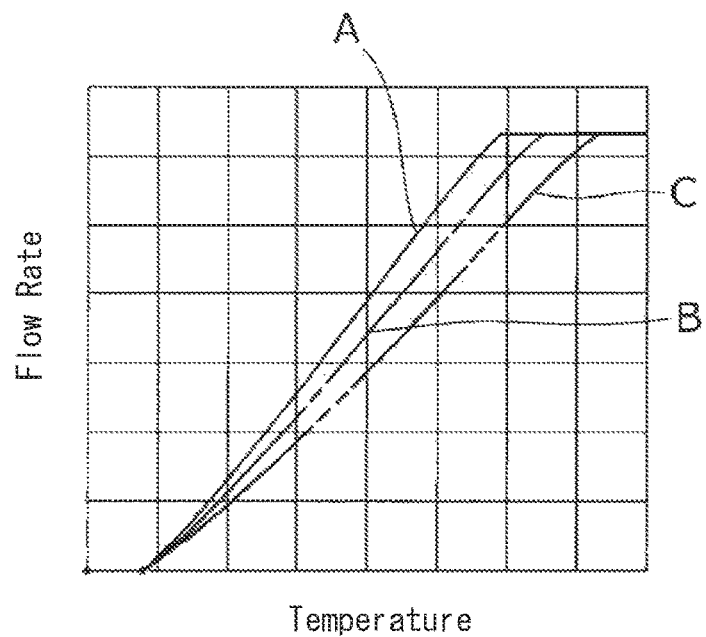
FIG. 6 is a diagram illustrating the temperature/flow characteristics of an expansion valve using the power element of the first embodiment.

FIG. 6 is a graph illustrating the temperature/flow characteristics of the expansion valve 1, where the refrigerant flow rate is represented on the vertical axis, and the temperature of the power element is represented on the horizontal axis. As described above, the expansion valve 1 can control the temperature of the refrigerant circulation system 100 by increasing the flow rate of the refrigerant as the temperature of the power element increases. However, what kind of refrigerant flow rate should be used at what temperature depends on the specifications of the refrigerant circulation system 100.

Here, in the case of an expansion valve provided with the power element 8 according to the first embodiment, since the support point diameter of the support point adjustment member 85 is $\varphi 1$, the temperature/flow rate characteristics of graph A illustrated by the solid line in FIG. 6 can be obtained.

In contrast, in the case of the expansion valve provided with the power element 8A according to the first modified example, the support point diameter of the support point adjustment member 85A is reduced to φ2 (<φ1). Accordingly, the temperature/flow rate characteristics of graph B illustrated by the long and short dashed line in FIG. 6 can be obtained, and the flow rate of the refrigerant decreases even at the same temperature of the power element as compared with graph A. The reason for this will be explained below. In the first modified example, the diaphragm 83 displaced toward the receiving member 86 side is supported by the support point P3 of the support point adjustment member 85A and deforms. In such a case, since the support point diameter is smaller in comparison with the case of being supported by the support point P2 (φ2<φ1), the displacement amount of the central portion 83b of the diaphragm 83 is reduced, and the valve opening amount of the valve element 3 is reduced.

Further, in the case of the expansion valve provided with the power element 8B according to the second modification, the diaphragm 83 is supported by the support point P4 of the support point adjustment member 85B and deforms, such that the support point diameter of the support point adjustment member 85B is further reduced to φ3 (<φ2). Accordingly, for the same reason, the temperature/flow rate characteristics of the graph C illustrated by the dashed line in FIG. 6 can be obtained, and the flow rate of the refrigerant is further reduced even at the same power element temperature as compared with graph B.

It should be noted that, as illustrated by the dotted line in FIG. 5, the supporting curved surface portion 85Bb can be further extended to the axis O side while conforming to the shape of the diaphragm 83. This has the effect of further reducing the diameter of the support point of the support point adjustment member.

In addition, the configuration illustrated by the dotted line in FIG. 5 has another effect. Supposing that the support point adjustment member were not provided, the diaphragm 83 would be displaced by using the support point of the receiving member 86. However, since it is required to avoid interference between the conical portion 86b of the receiving member 86 and the disk portion 84b of the stopper member 84, there is a limitation in reducing the diameter of the support point of the receiving member 86.

In contrast, in the configuration illustrated by the dotted line in FIG. 5, the inner circumferential end (the support point) P5 of the support point adjustment member 85B is located between the diaphragm 83 and the outer circumferential step portion 84d of the stopper member 84, so that the support point adjustment member 85B and the stopper member 84 can be installed so as to overlap each other in the axis O direction without interfering with each other. That is, by using the configuration illustrated by the dotted line in FIG. 5, the degree of freedom for reducing the support point diameter is increased without causing interference with other components.

As described above, according to the present embodiment, even in cases where the power element is configured by using common components for the upper lid member 82, the diaphragm 83, and the receiving member 86, by selecting and assembling one of any of the support point adjustment members 85, 85A, 85B having different shapes, different temperature/flow rate characteristics of the expansion valve can be obtained. In this way, despite the fact that the temperature/flow rate characteristics can be extensively tuned according to the specifications of the refrigerant circulation system 100, it is possible to provide an expansion valve at a low cost.

Second Embodiment

Figure 7:
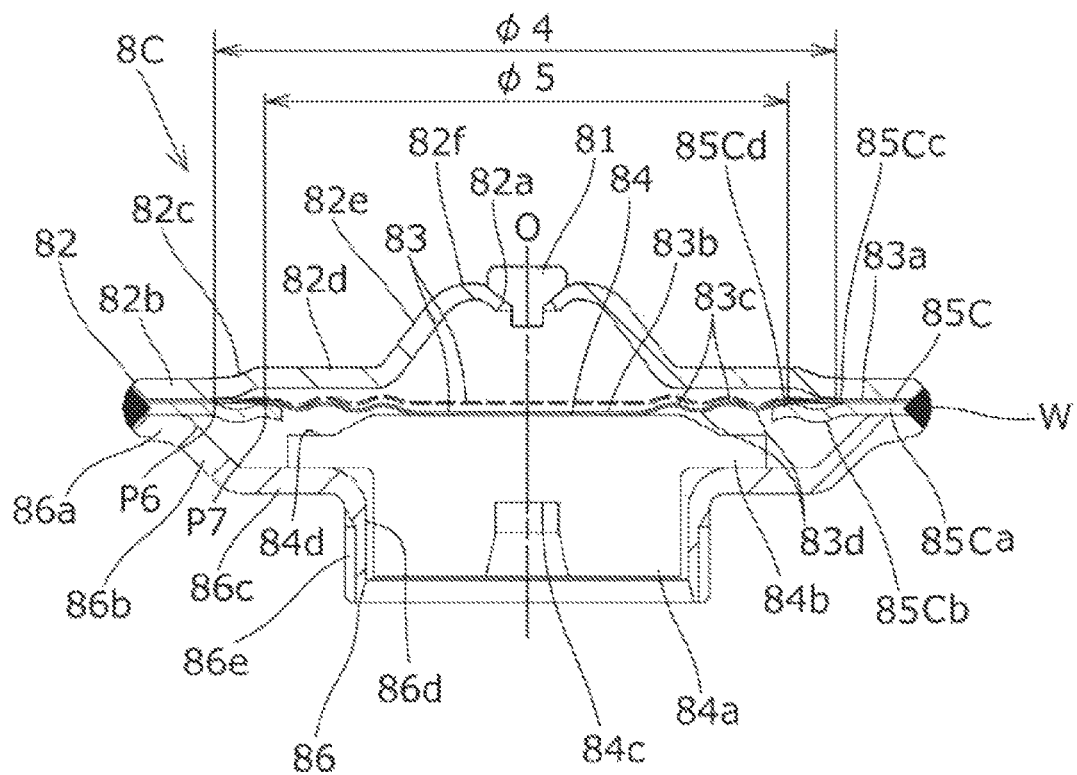
FIG. 7 is an enlarged cross-sectional view of the power element of the second embodiment.

FIG. 7 is an enlarged cross-sectional view of the power element 8C of the second embodiment. In the second embodiment, the shape of the support point adjustment member 85C is changed with respect to the power element 8B of the second modified example. More specifically, in the cross section of FIG. 7, an outer convex portion 85Cc and an inner convex portion 85Cd forming an annular convex curved surface are provided on the supporting curved surface portion 85Cb of the support point adjustment member 85C, respectively. Since the rest of the configuration is the same as that of the above-described embodiments, the same reference numerals are given and a redundant description will be omitted.

When the diaphragm 83 is displaced from the upper lid member 82 side to the receiving member 86 side, it first comes into contact with the outer convex portion 85Cc (illustrated by the dotted line in FIG. 7). In such a case, the support point on the support point adjustment member 85C side becomes P6 on the outer convex portion 85Cc, and the support point diameter thereof becomes φ4. Further, when the diaphragm 83 is displaced toward the receiving member 86 side, it next comes into contact with the inner convex portion 85Cd (illustrated by the solid line in FIG. 7). In such a case, the support point on the support point adjustment member 85C side becomes P7 on the inner convex portion 85Cd, and the support point diameter thereof becomes φ5 (<φ4).

In other words, it is possible to obtain two-step temperature/flow rate characteristics while using a single support point adjustment member 85C. More specifically, with reference to FIG. 6, for example, at a temperature lower than a predetermined temperature, the support point P6 on the support point adjustment member 85C side can be used to obtain characteristics similar to those of the graph B. Further, at a temperature higher than a predetermined temperature, by using the support point P7 that is shifted inward in the radial direction from the support point P6, characteristics similar to those of the graph C can be obtained. It should be noted that, in the above embodiments, the number of support points is two, but three or more support points differing in the radial direction may be used.

Third Embodiment

Figure 8:
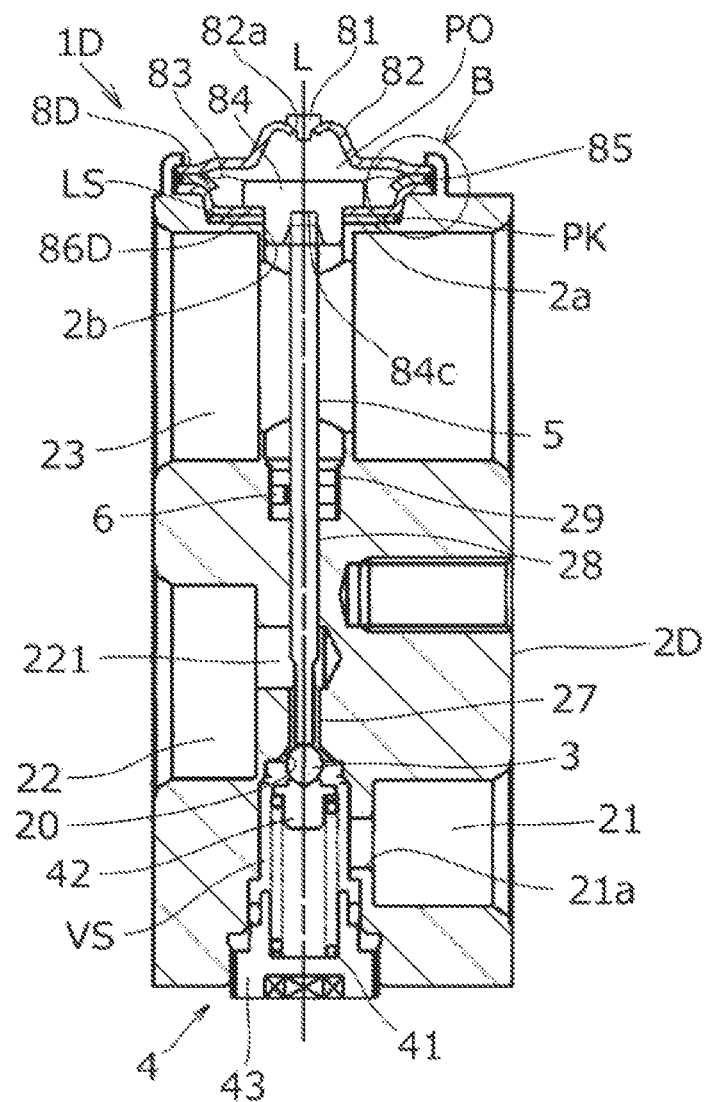
FIG. 8 is a schematic sectional view illustrating an expansion valve of the third embodiment.
Figure 9:
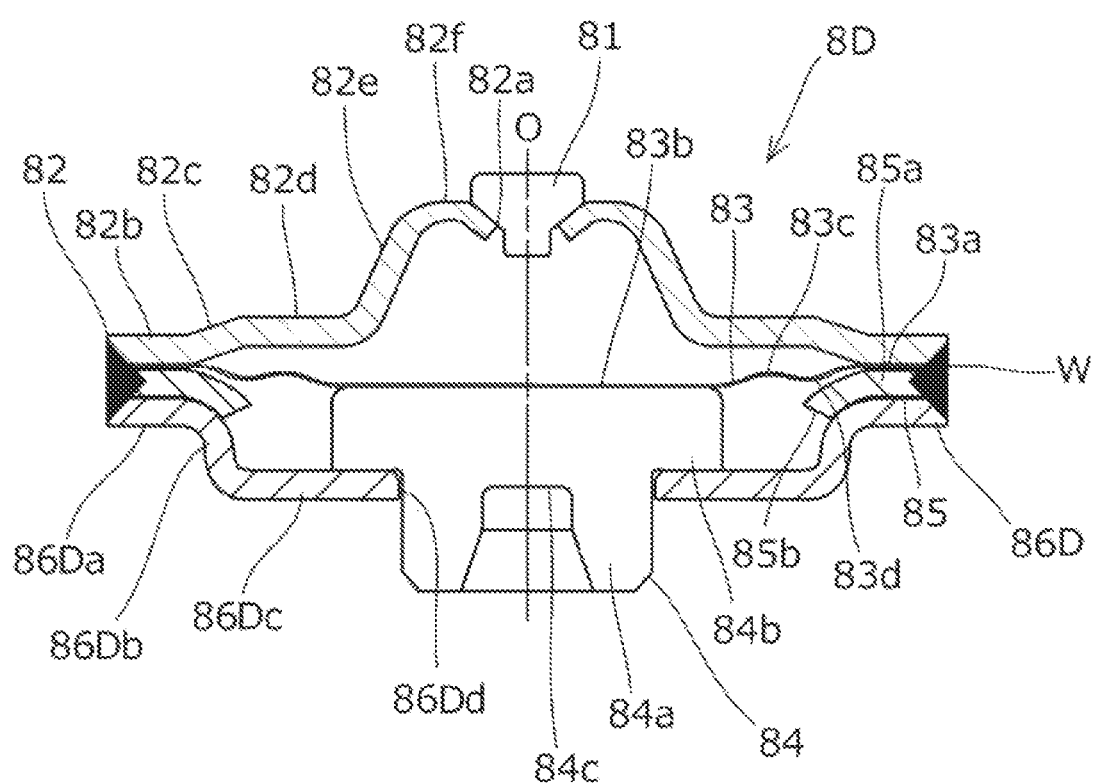
FIG. 9 is a cross-sectional view of a power element of the third embodiment.
Figure 10:
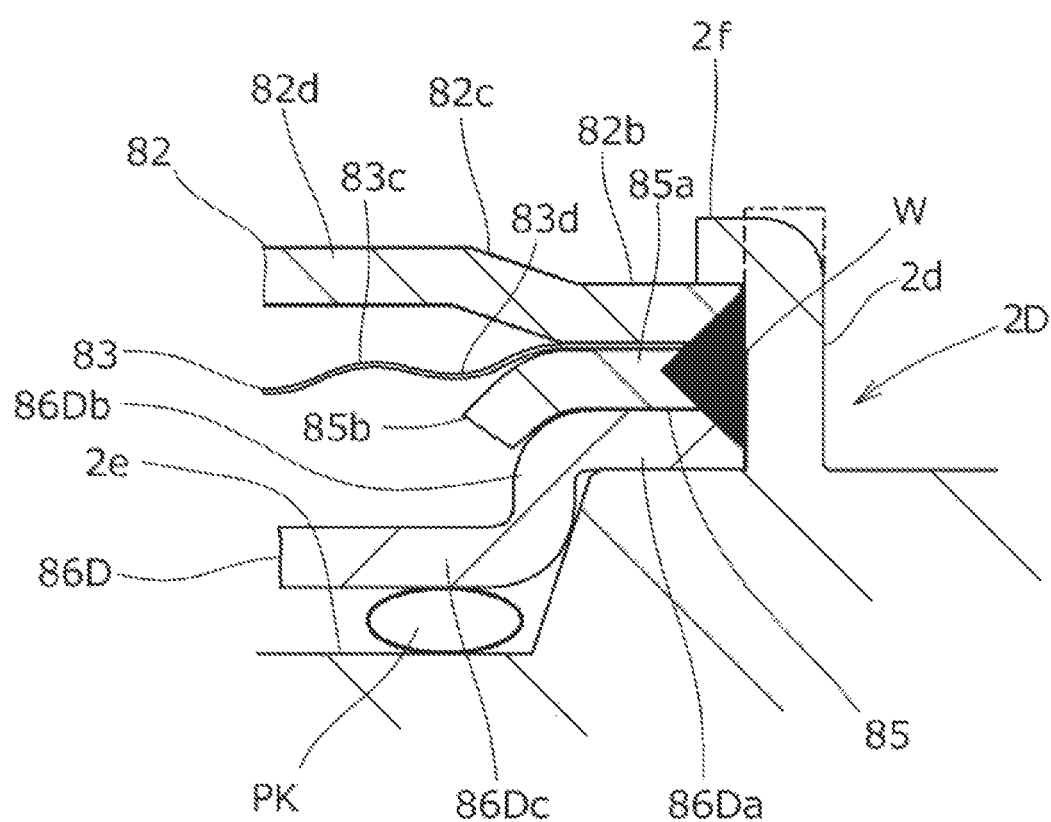
FIG. 10 is an enlarged cross-sectional view illustrating an enlarged portion B of FIG. 8 according to the third embodiment.

FIG. 8 is a schematic cross-sectional view illustrating the expansion valve 1D according to the third embodiment. FIG. 9 is a cross-sectional view of the power element 8D according to the third embodiment. FIG. 10 is an enlarged cross-sectional view illustrating an enlarged portion B of FIG. 8. according to the third embodiment.

The expansion valve 1D illustrated in FIG. 8 differs from the expansion valve 1 according to the first embodiment in the power element 8D and the upper configuration of the valve main body 2D. That is, in the present embodiment, the power element 8D and the valve main body 2D are not connected by engaging a screw, and the connection between the two is performed by caulking. Since the rest of the configuration is the same as that of the first embodiment, the same reference numerals are given and redundant description will be omitted.

In FIG. 9, the power element 8D includes a plug 81, an upper lid member 82, a diaphragm 83, a receiving member 86D, a support point adjustment member 85, and a stopper member 84. Again, it is assumed that the upper lid member 82 side is the upper side and the receiving member 86D side is the lower side. It should be noted that the stopper member need not be provided.

In the power element 8D according to the present embodiment, only the configuration of the receiving member 86D is primarily different from that of the power element 8 according to the first embodiment. Since the plug 81, the upper lid member 82, the diaphragm 83, the support point adjustment member 85, and the stopper member 84 have basically the same configuration except for minor differences in shape, the same reference numerals are given and redundant description will be omitted.

The receiving member 86D formed by molding a metal plate material by pressing includes a flange portion 86Da having an outer diameter substantially the same as the outer diameter of the outer plate portion 82b of the upper lid member 82, a hollow cylindrical portion 86Db that extends the lower side and that is continually provided on the inner circumference of the flange portion 86Da, and an annular inner plate portion 86Dc continuously provided on the inner circumference of the lower end of the hollow cylindrical portion 86Db. The inner plate portion 86Dc includes a central opening 86Dd into which the main body 84a of the stopper member 84 is fitted.

When assembling the power element 8D, while placing the stopper member 84 between the diaphragm 83 and the receiving member 86D, the outer plate portion 82b of the upper lid member 82, the outer circumferential portion 83a of the diaphragm 83, the annular flat plate portion 85a of the support point adjustment member 85, and the flange portion 86Da of the receiving member 86D are overlapped in this order and pressed in the axial direction. Meanwhile, the outer circumference is welded by, for example, TIG welding, laser welding, plasma welding, or the like to form a welded portion W over the entire circumference, such that the components are integrated.

Subsequently, the working gas is sealed in the space surrounded by the upper lid member 82 and the diaphragm 83 from the opening 82a formed in the upper lid member 82, and then the opening 82a is sealed with the plug 81. Further, the plug 81 is fixed to the upper lid member 82 by projection welding or the like. In this way, the power element 8D can be assembled.

In FIG. 10, the valve main body 2D formed of a metal such as aluminum includes a circular tube portion 2d extending from the upper end thereof. The inner diameter of the circular tube portion 2d is equal to or slightly larger than the outer diameter of the power element 8D.

Prior to attaching the power element 8D to the valve main body 2D, the circular tube portion 2d has a cylindrical shape with axis L (FIG. 8) as its axis, as illustrated by the dotted line. When attaching the power element 8D to the valve main body 2D, an annular packing PK is arranged on the step portion 2e of the valve main body 2D so as to approach the valve main body 2D from the receiving member 86D side, and the power element 8D is fit into the circular tube portion 2d. At this time, the packing PK is interposed between the inner plate portion 86Dc and the step portion 2e.

In this state, when the tip of the circular tube portion 2d is caulked inward using a caulking tool (not illustrated in the Figures), the tip of the circular tube portion 2d is elastically deformed toward the axis L to form an annular caulked portion 2f. The outer circumferential upper surface of the outer plate portion 82b of the upper lid member 82 is pressed and fixed by the caulked portion 2f. As a result, the packing PK is compressed in the axis L direction between the inner plate portion 86Dc and the step portion 2e, the space in the recess portion 2a connected to the lower space LS is sealed, and leakage of the refrigerant from the recess portion 2a is prevented.

The expansion valve 1D illustrated in FIG. 8 can also be incorporated into the refrigerant circulation system 100 illustrated in FIG. 1, and exhibits the same functions as the expansion valve 1 according to the first embodiment.

It should be noted that the present invention is not limited to the above-described embodiments. Within the scope of the present invention, any component of the above-described embodiments can be modified. In addition, any component can be added or omitted in the above-described embodiments.

REFERENCE SIGNS LIST 1, 1D . . . Expansion valve
2, 2D . . . Valve main body
3 . . . Valve element
4 . . . Biasing device
5 . . . Operation rod
6 . . . Ring spring
8, 8A, 8B, 8C, 8D . . . Power element
20 . . . Valve seat
21 . . . First flow path
22 . . . Second flow path
221 . . . Intermediate chamber
23 . . . Return flow path
27 . . . Valve through hole
28 . . . Operation rod insertion hole
29 . . . Annular recess
41 . . . Coil spring
42 . . . Valve element support
43 . . . Spring receiving member
81 . . . Plug
82 . . . Upper lid member
83 . . . Diaphragm
84 . . . Stopper member
85, 85A, 85B, 85C Support point adjustment member
86, 86D . . . Receiving member
100 . . . Refrigerant circulation system
101 . . . Compressor
102 . . . Condenser
104 . . . Evaporator
VS . . . Valve chamber
P1 . . . Support point on the upper lid member side
P2-P7 . . . Support point on the support point adjustment member side

The invention claimed is:

1. A power element comprising:
a diaphragm that is provided with an outer circumferential portion, a central portion, and a plurality of ring-shaped portions formed between the outer circumferential portion and the central portion, the outer circumferential portion and the central portion being coaxial with an axis of the power element;
an upper lid member that is joined to one side of the outer circumferential portion of the diaphragm and that forms a pressure working chamber with the diaphragm;
a support point adjustment member that is provided with an annular flat plate portion joined to another side of the outer circumferential portion of the diaphragm, and a supporting curved surface portion connected to an inner circumference of the annular flat plate portion, wherein the supporting curved surface portion of the support point adjustment member has a shape that extends toward the axis of the power element while conforming to the shape of the diaphragm; and a receiving member that is provided with a flange portion joined to the annular flat plate portion of the support point adjustment member, and a conical portion continuously provided on the inner circumference of the flange portion and extended toward a lower side of the power element, a refrigerant inflow chamber being formed between the diaphragm and the conical portion;

wherein the diameters of the diaphragm, the upper lid member, support point adjustment member, and the receiving member are substantially equal with each other, and the peripheries thereof are integrated by welding, the annular flat plate portion of the support point adjustment member has a wider radial width than the flange portion of the receiving member, and when the diaphragm bends and becomes displaced, the diaphragm is capable of coming into contact with the supporting curved surface portion of the support point adjustment member.

2. The power element according to claim 1, wherein a contact position of the diaphragm with which the supporting curved surface portion comes into contact shifts in a radial direction according to a displacement amount of the diaphragm.

3. The power element according to claim 1, further comprising:
a stopper member housed in the refrigerant inflow chamber.

4. The power element according to claim 1,
wherein a hardness of the support point adjustment member is lower than a hardness of the diaphragm.

5. An expansion valve comprising:
a power element according to claim 1;
a valve main body provided with a refrigerant flow path communicating with the refrigerant inflow chamber, having a valve chamber and a valve seat;
a valve element disposed in the valve chamber;
a coil spring that presses the valve element toward the valve seat; and
an operation rod having one end in contact with the valve element and another end in contact with the stopper member,
wherein the diaphragm is displaced by a pressure difference between a pressure working chamber of the power element and the refrigerant inflow chamber to drive the valve element against a biasing force of the coil spring.

6. The power element according to claim 1, wherein
the plurality of ring-shaped portions are coaxial with respect to the axis of the power element respectively and include a plurality of upper ring-shaped portions protruding upward and a plurality of lower ring-shaped portions protruding downward alternately along the radial direction, and
the supporting curved surface portion of the support point adjustment member has a shape that extends to at least one ring-shaped portion of the plurality of ring-shaped portions while conforming to the shape of the diaphragm.

* * * * *